United States Patent [19]

Jackson et al.

[11] Patent Number: 5,530,576
[45] Date of Patent: * Jun. 25, 1996

[54] OPTICAL ROTARY CONTROL DEVICE USING A MICROPROCESSOR

[75] Inventors: Gregory D. Jackson, Plantation; Robert B. Akins, Coral Springs; Mac W. Branan, Jr., Ft. Lauderdale, all of Fla.

[73] Assignee: Motorola, Inc., Schaumburg, Ill.

[*] Notice: The term of this patent shall not extend beyond the expiration date of Pat. No. 5,392,146.

[21] Appl. No.: 87,229

[22] Filed: Jul. 2, 1993

Related U.S. Application Data

[63] Continuation-in-part of Ser. No. 8,430, Jan. 25, 1993, Pat. No. 5,392,146.

[51] Int. Cl.⁶ .................................................. H04B 10/00
[52] U.S. Cl. ........................... 359/145; 359/146; 250/229
[58] Field of Search ...................................... 359/142, 143, 359/144, 145, 146, 147, 148, 173; 455/170.1; 250/229, 227; 385/25, 26

[56] References Cited

U.S. PATENT DOCUMENTS

| | | | |
|---|---|---|---|
| 4,631,399 | 12/1956 | Ward | 250/221 |
| 4,818,051 | 4/1989 | Fraser | 359/195 |
| 4,964,693 | 10/1990 | Branan et al. | 359/152 |
| 5,177,355 | 1/1993 | Branan, Jr. | 359/152 |
| 5,347,123 | 9/1994 | Jackson et al. | 250/229 |
| 5,359,448 | 10/1994 | Laszlo et al. | 359/142 |
| 5,379,143 | 1/1995 | Takano | 359/179 |
| 5,392,146 | 2/1995 | Jackson et al. | 359/145 |

*Primary Examiner*—Leo Boudreau
*Assistant Examiner*—Rafael Bacares
*Attorney, Agent, or Firm*—Lesley Ann Rhyne; Frank M. Scutch, III

[57] ABSTRACT

A rotary control device is provided comprising a light receptor (52), a plurality of light sources (54) radially spaced from the light receptor (52), a light director (14) having means for directing light from the light source (54) to the receptor (52) and means for rotating the director (14) thereby selectively directing light from the light sources (54) to the light receptor (52). In another aspect of the invention, the optical rotary device further comprises an isolator (56) made of opaque material which surrounds four sides of the light receptor (52) and four sides of the light sources (54). In a further aspect of the invention the light director includes a reflector (46) for directing the light from the light sources (54) to the light receptor (52).

16 Claims, 4 Drawing Sheets

OPTICAL ROTARY CONTROL DEVICE USING A MICROPROCESSOR

CROSS REFERENCE TO RELATED APPLICATIONS

This is a continuation-in-part of application Ser. No. 08/008,430, filed Jan. 25, 1993, by Jackson et al., and entitled Optical Rotary Control Device, assigned to Motorola, Inc. now U.S. Pat. No. 5,392,146.

TECHNICAL FIELD

This invention relates generally to optical rotary control devices and more specifically to optical rotary control devices for radio frequency communication devices.

BACKGROUND

Switches and other controls for electronic devices are typically discrete component assemblies requiring multiple parts. A higher number of parts generally requires an increase in the size of the device and the space required to house the device as well as the cost. Furthermore, with an increase in number of parts there is a decrease in reliability. Discrete controls with multiple parts are difficult to interconnect to an electronic device. The discrete controls require separate interconnections which must be made from the control component to the rest of the electronic device, usually contained on a PCB (printed circuit board). The interconnections require flex circuits, hand soldered joints and wire connections, all which increase the cost and size of the electronic device. These interconnections consume valuable space that is often premium in small electronic devices such as portable radios. Moreover, making these interconnections complicates the assembly process, and creates the possibility of quality problems caused by PCB contamination and contact failure. Discrete controls also utilize mechanical contacts to achieve the control function. Such contacts degrade with time and use resulting in an unreliable control device.

Optical control devices which are well known in the art, have typically required a multiple number of light sources and/or a multiple number of light receptors. At least one light receptor is required for each control state. Thus, such conventional optical devices require premium board space and are expensive. Furthermore, conventional optical devices have not provided absolute position indication upon start up. In other words, such conventional optical devices only give relative information from an unknown state. Alternatively, optical control devices that measure the intensity of reflected light to an optical receiver are also well known and are of the type disclosed in U.S. Pat. No. 4,964,693 to Branan et al. Such a device requires appropriate control circuitry capable of measuring the intensity of the reflected light.

Since consumers demand smaller and more reliable control devices, a need exists for a reliable optical switch, as an absolute position indicator, that can be easily manufactured and consume only a small portion of the apparatus in which it is contained.

DETAILED DESCRIPTION OF THE PREFERRED EMBODIMENT

Figure 1:
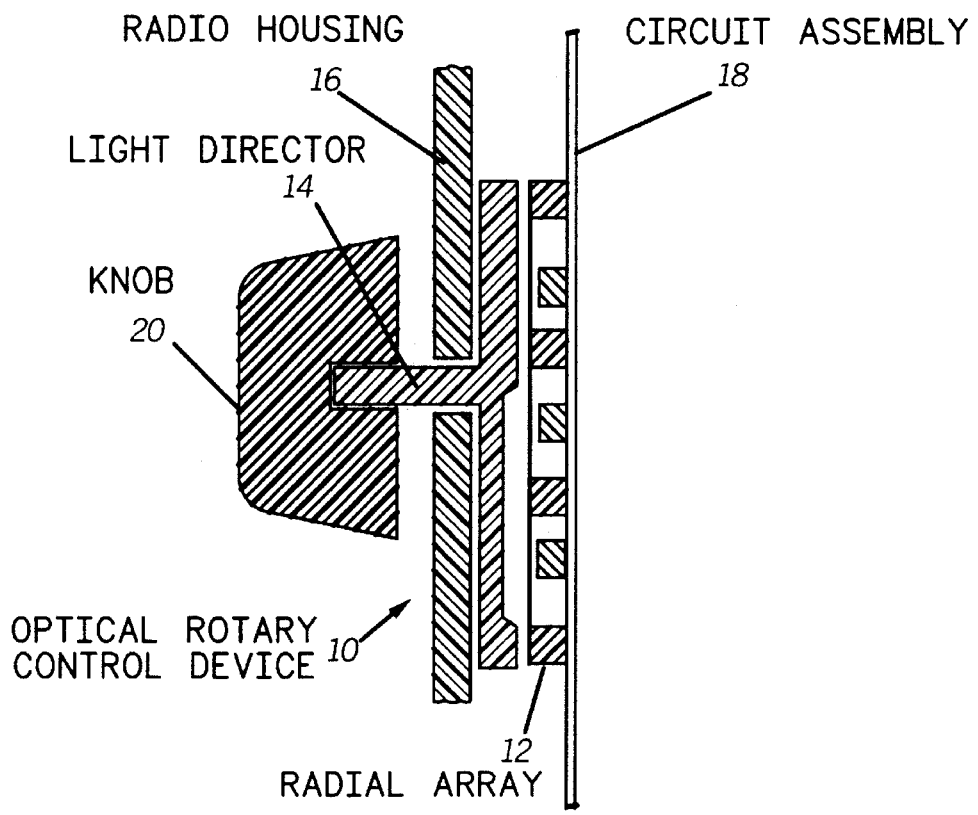
FIG. 1 is a cross-sectional side view of an optical rotary control device according to the invention.

While the specification concludes with claims defining the features of the invention that are regarded as novel, it is believed that the invention will be better understood from a consideration of the following description in conjunction with the drawing figures, in which like reference numerals are carried forward.

FIG. 1 shows a cross-sectional side view of an optical rotary control device 10 according to the invention. The control device 10 includes a radial array 12 mounted on a circuit assembly such as a flexible circuit or PCB (printed circuit board) 18 within a radio housing 16. A knob 20 for controlling a parameter of the radio, such as volume or channel select, is located on the outside of the radio housing 16. Mounted within the knob 20 is a light director 14. The light director 14 extends through the radio housing 16 and is spaced from the radial array 12 or is rotatably connected to the radial array 12 on the circuit assembly 18. Alternatively, the light director 14 may be rotatably attached to the radio housing 16 and spaced so that it rotates over the radial array 12.

Figure 2:
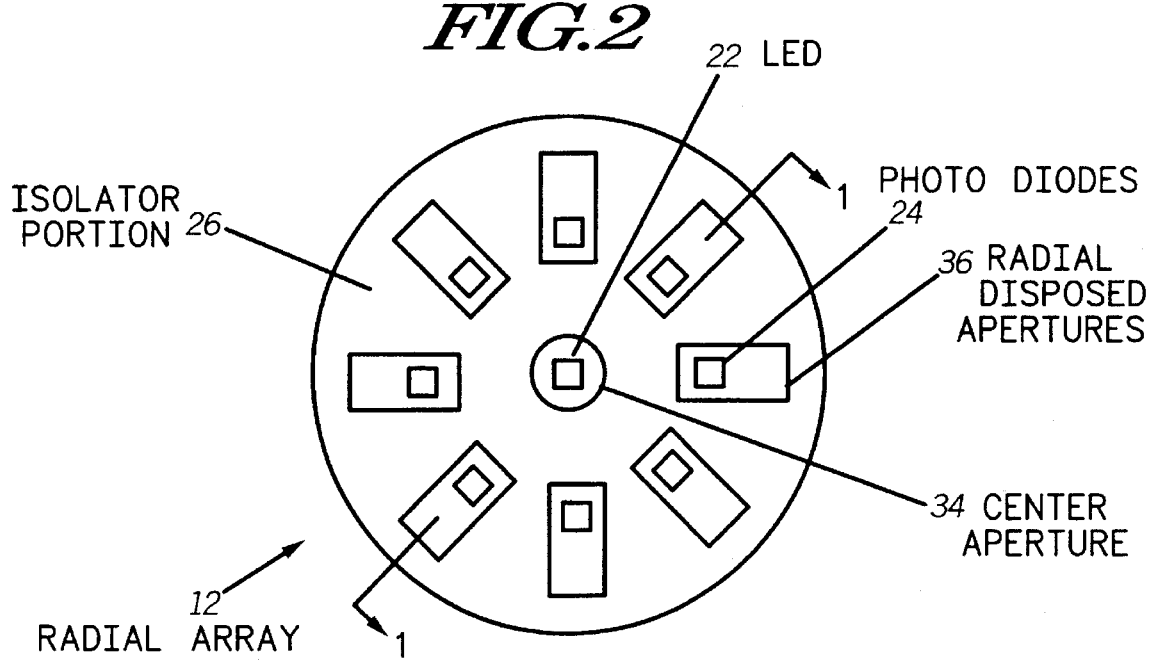
FIG. 2 is a top view of a radial array according to the invention.

FIG. 2 shows a preferred embodiment of a radial array 12 according to the invention. The shown radial array 12 is circular in shape but may be semicircular or any geometric shape that defines a radial pattern of an isolator portion 26 with a center aperture 34 surrounded by eight radially disposed apertures 36 about the center aperture 34. Depending upon the application, the number of radially disposed apertures 36 about the center aperture 34 may vary. The center aperture 34 of the isolator portion 26 is for receiving and isolating a light source, such as a LED (light emitting diode) 22. The eight radially arranged apertures 36 about the center aperture 34 are for receiving and isolating light receptors, such as photo transistors or photo diodes 24.

The isolator portion 26 may be made of any opaque material. The phototransistors 24 are set within the isolator portion 26 of the radial array 12. Each phototransistor 24 is surrounded on four sides by the opaque material of the isolator 26. The LED 22 is surrounded by the opaque material of the isolator 26 as well. The isolator portion 26 is designed so that a light director 14 spaced from the radial array directs light, visible or infrared, from the LED 22 to one or two of the phototransistors 24 at one time. The isolator portion 26 also keeps ambient light from exciting the phototransistors 24 unintentionally. The isolator portion 26 may be separately adhesively bonded to a circuit assembly, such as a flexible circuit or PCB 18. Signals from the phototransistors 24 may be directly outputted to a microprocessor or controller of the radio by circuit lines running underneath the radial array 12 and to the microprocessor or microcontroller. A common transparent epoxy such as a glob top or other suitable material covers the LED 22, phototransistors 24 and wire bonds as a protective coating.

Figure 3:
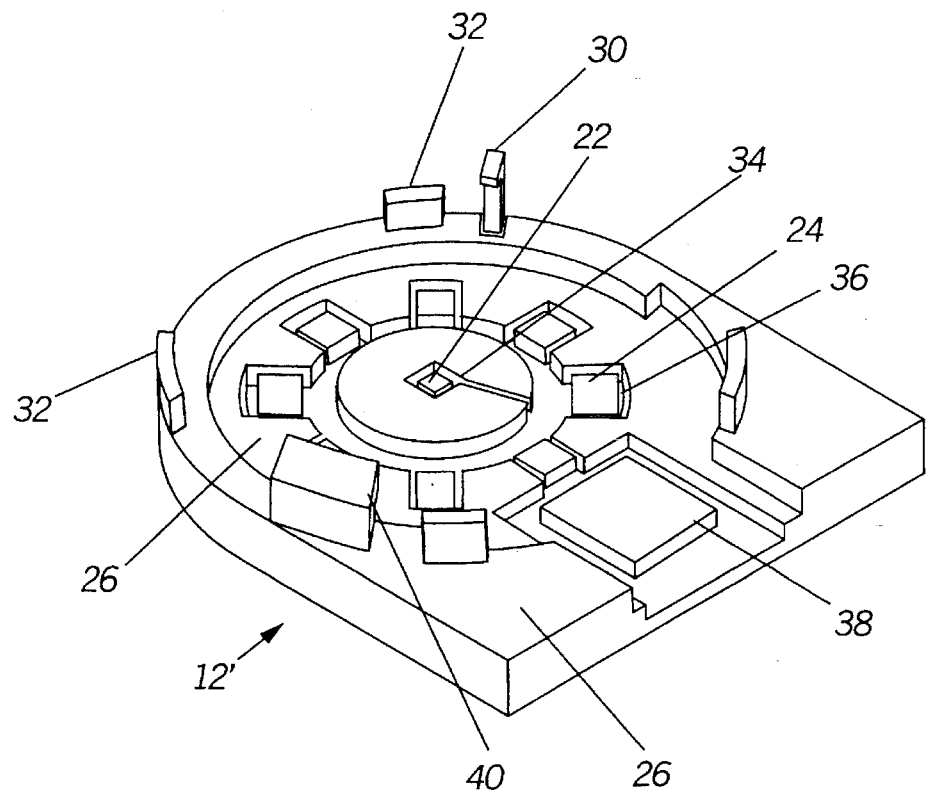
FIG. 3 is a perspective view of a second embodiment of a radial array according to the invention.

In a second embodiment of the invention, the radial array 12' may be a separate molded-in circuit carrier piece that can be selectively metalized, i.e., 3-D molded circuit, as shown in FIG. 3, and the entire circuit carrier piece can be reflow soldered or surface mounted onto a circuit assembly. Cantilever snaps 30 may be used to rotatably connect the light director 14 to the radial array 12'. A hook 40 may be used to assist the snap fit alignment of the light director 14. Guides 32 may be used for precisely rotating the light director 14 when snapped onto the radial array 12'.

A logic die 38 may be integral to the isolator portion 26 of the radial array 12' or separately mounted on the circuit assembly 18. The logic die 38 receives input from the phototransistors 24 and depending on the input, outputs a particular control state to the microprocessor of the radio. The logic die 38 decodes which phototransistors 24 are excited and outputs a desired control state accordingly. A simple decoding scheme based on a truth table can be implemented in the logic die 38. Integral integrated circuits for encoding a plurality of switch inputs into a combination of switch outputs are known and one in particular has been disclosed in U.S. Pat. No. 5,153,319 for a mechanical switch assembly. By using an integral digital decoding scheme, the preferred embodiment of the present invention is more resistant to interference and noise than conventional analog control devices.

Figure 4:
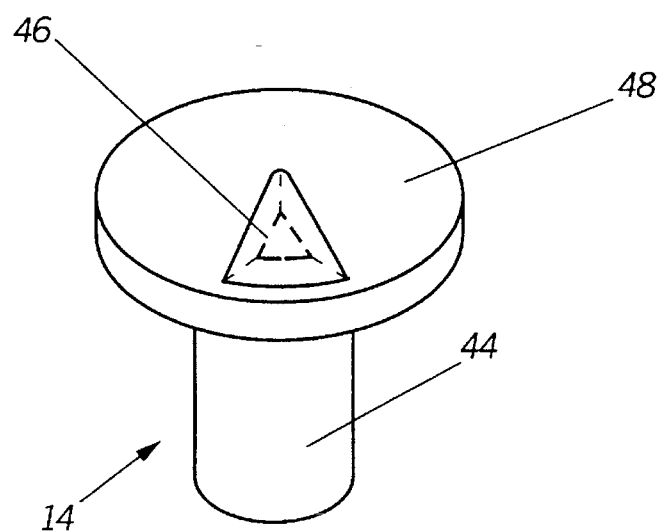
FIG. 4 is a perspective view of a light director according to an alternate embodiment of the invention.

FIG. 4 shows a perspective view of a light director 14 in accordance with the invention. The light director 14 includes a circular portion 48 having a reflector 46 or concave surface for reflecting light from the LED 22 to the phototransistors 24. The reflector 46 is substantially triangular in shape and extends into the circular portion 48. The reflector 46 is geometrically defined for reflecting light from the LED 22 to one of the phototransistors 24 or two of the phototransistors 24. In another aspect of the invention, a light pipe arrangement may be used instead of the reflector 46 to direct light to the phototransistors 24.

The light director 14 includes a shaft portion 44 for rotating the circular portion 48 of the light director 14. The shaft portion 44 is integral with the circular portion 48 and has a diameter that is usually smaller than that of the circular portion 48. The shaft portion 44 may extend into a knob 20 of a radio housing 16 (as shown in FIG. 1) or the shaft portion 44 may extend from the radio housing 16 and function as a knob used by an operator to control the rotary optical control device 10. By simply rotating the shaft portion 44 an operator selects a desired output of the radio.

In operation, the LED 22 is strobed by the microprocessor to reduce current drain. The light director 14 is spaced from the phototransistors 24 and the phototransistors 24 are spaced apart so that when the light director 14 directs light from the LED 22 to the phototransistors 24, the light can be directed to one or two of the phototransistors 24. Thus, there are sixteen possible output states for an optical control device 10 that has eight phototransistors 24 arranged as shown. In the preferred embodiment, two phototransistors 24 are used for outputting even numbered positions. Alternatively, the light director 14 and radial array 12 may be designed and spaced so that it only reflects light to only one of the phototransistors 24 or none of the phototransistors 24 and thus, the optical control device 10 may simply serve as an on and off switch. The light director 14 and radial array 12 could even be designed to reflect light to a combination of a multiple phototransistors 24. The light reflection is a function of the surface of the light director 14 spaced from the arrangement of the phototransistors 24 on the radial array 12 so that when rotated the light director 14 directs light from the LED 22 to the phototransistors 24. Thus, there can be any number of absolute output states depending upon the number of phototransistors 24 and the light director 14. The present invention outputs from the phototransistors 24 an absolute position control state dependent upon which phototransistors 24 in combination or alone are excited. Even upon start up, an absolute state or position can be determined by the output of the phototransistors 24.

In summary, an integral radial array 12 provides the light source 22, light receptors 24, and the isolator 26. A light director 14 directs the light source 22 accordingly. The present invention uses only a single moving part to achieve an optical rotary control device. Thus, a miniaturized optical rotary switch is provided that is reliable and small enough for applications in any device requiring a rotary control function in particular, portable and mobile radios.

Figure 5:
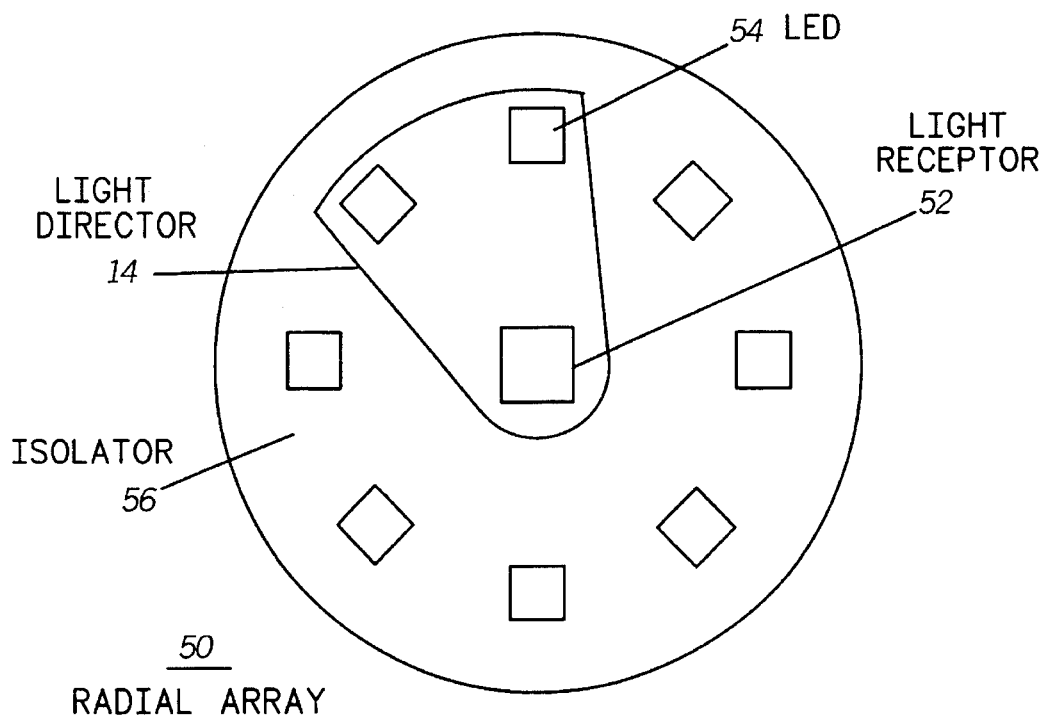
FIG. 5 is a top view of a radial array according to an alternate embodiment of the present invention.

In an alternate embodiment of the present invention, a light receptor 52 may be placed in the center of the radial array 50 while light sources 54 are placed around the light receptor 52 as shown in FIG. 5. Light sources 54 such as LEDs are typically smaller than light receptors 52 such as phototransistors. Thus, by radially placing LEDs 54 around a phototransistor 52 instead of phototransistors around a LED saves space. As previously described, the optical rotary device further comprises an isolator 56 made of opaque material which surrounds four sides of the light receptor 52 and four sides of the light sources 54.

A light director 14, as previously described and shown in FIG. 4, may selectively direct light from one light source 54 or a plurality of light sources 54 to the phototransistor 52. Similarly, the light director 14 includes a reflector portion 46 or a concave surface for reflecting light from the light sources 54 to the phototransistor 52.

Figure 6:
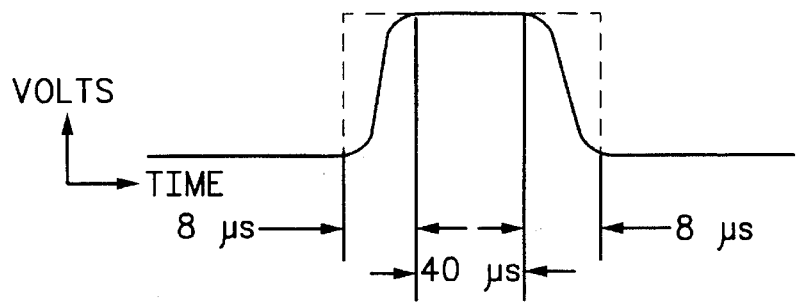
FIG. 6 is a timing diagram for a LED and a phototransistor according to the alternate embodiment of FIG. 5.
Figure 6:
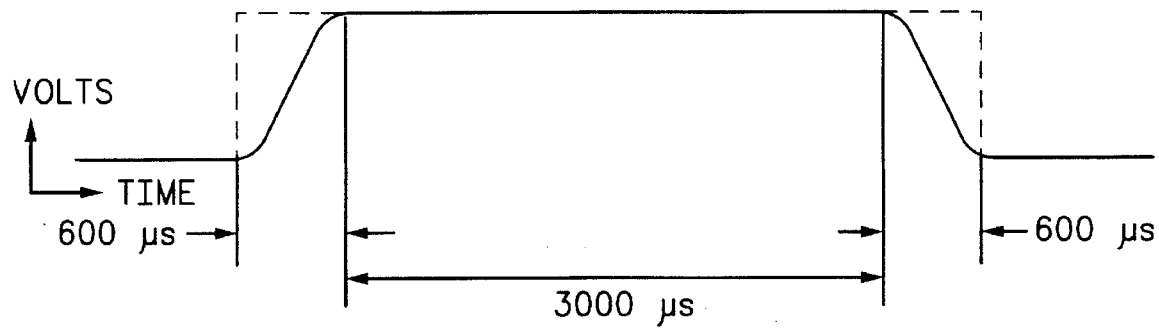
Figure 7:
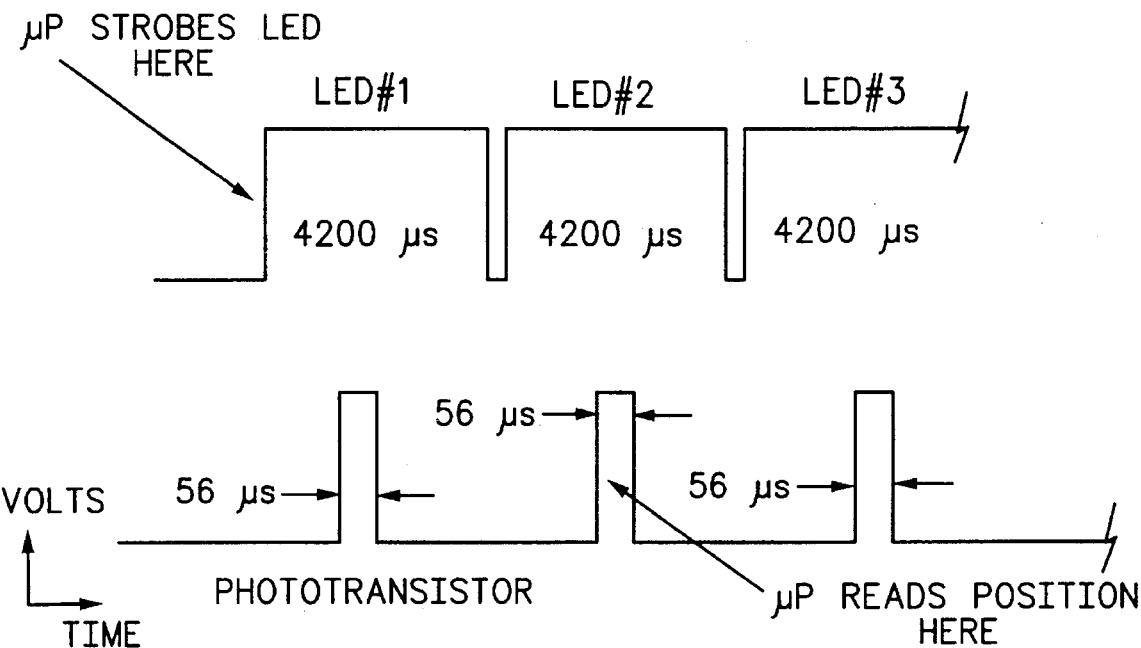
FIG. 7 is a timing diagram for a phototransistor and plurality of LEDs according to the alternate embodiment of FIG. 5.

FIG. 6 shows a timing diagram for a LED 54, particulary a Motorola MLEDC1000, and a phototransistor 52, particularly a Motorola MRDC200, according to the preferred embodiment. A typical LED (Motorola MLEDC1000) 54 has a rise/fall time of 600 microseconds. A typical phototransistor (Motorola MRDC200) 52 has a rise/fall time of 8 microseconds. The LEDs 54 and can be left on as long as the user desires but must be on at least as long as the phototransistor 52 is turned on in order to find out which LEDs 54 are exciting the phototransistor 52. In the preferred embodiment, each LEDs 54 is strobed on for 4200 microseconds while the phototransistor 52 is strobed on for 56 microseconds as shown in FIG. 7. FIG. 7 shows a LED 54 and phototransistor 52 strobe cycle for three LEDs 54. A microprocessor 82 reads the phototransistor state each time the phototransistor 52 is strobed to determine which LED 54 or combination thereof are exciting the phototransistor 52.

Figure 8:
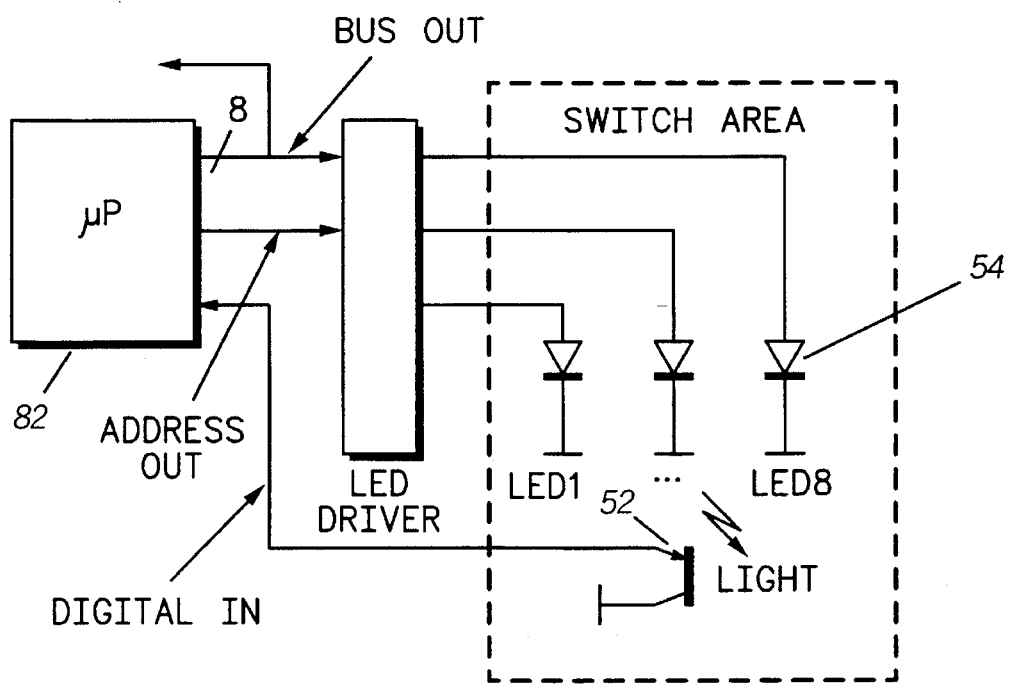
FIG. 8 is a schematic implementation of the alternate embodiment to the alternate embodiment of FIG. 5.

FIG. 8 show a schematic of the alternate embodiment. A microprocessor 82 controls both the LEDs 54 and the phototransistor 52. As described above, each LED 54 will be strobed on for a certain period of time one after the other. The period of time in the preferred embodiment is 4200 microseconds. During the time that each LED 54 is strobed, the microprocessor 82 will read the phototransistor 52 to check to see if the phototransistor 52 is excited. If the phototransistor 52 is on then the light director 14 is directing light from the LED 54 being strobed to the phototransistor 52. If the phototransistor 52 is not on then the light director 14 is not directing light from the LED 54 being strobed. The microprocessor 82 may be programmed a number of ways in order to decide which LED 54 the light director 14 is reflecting light from or which combination of LEDs 54 the light director 14 is reflecting light from.

In operation, a user turns the control knob 20 to a desired position. Each LED 54 is strobed on for a desired amount of time that allows the phototransistor 52 to be read to determine which LED 54 or plurality of LEDs 54 are exciting the phototransistor 52. Each particular LED 54 and combination of adjacent LEDs 54 depict a particular control state. Thus, for eight LEDs there are sixteen possible control states.

While the invention has been particularly shown and described with reference to several preferred embodiments thereof, it will be understood by those skilled in the art that various changes in form and detail may be made without departing from the spirit or scope of the invention.

What is claimed is:

1. An optical rotary control device, comprising:

light receptor;

plurality of light sources radially spaced from said light receptor;

light director rotatable about said light receptor and having means for directing light from at least one of the plurality of light sources to the receptor;

means for determining which of said light sources are directing light to said light receptor; and wherein said light director further comprises a circular portion with a first diameter and a shaft portion integrally connected to said circular portion, said shaft portion having a second diameter smaller than said first diameter of said circular portion.

2. The optical rotary control device of claim 1 further comprising an isolator comprising opaque material surrounding four sides of said light receptor and four sides of each of said light sources.

3. The optical rotary control device of claim 1 wherein said light director comprises means for rotating said light director.

4. The optical rotary control device of claim 1 wherein said means for directing light includes a reflector having a concave surface.

5. The optical rotary control device of claim 1 wherein said means for directing light includes a light pipe.

6. The optical rotary control device of claim 3 wherein said light director and said means for rotating said light director is a single movable part.

7. An optical rotary control device, comprising:

an opaque radial light isolator having a center aperture with at least two radially arranged apertures about said center aperture;

a light receptor disposed within said center aperture of said isolator;

light sources disposed within said radially arranged apertures of said isolator;

a rotatable light director disposed about the light receptor and having means for directing light to the receptor from at least one of said light sources.

8. The optical rotary control device of claim 7 wherein said light director directs light from at least two of said light sources to said light receptor simultaneously.

9. The optical rotary control device of claim 7 wherein said light director includes a reflector portion having a concave surface being spaced from said isolator so that said reflector portion directs light from said light sources to said receptor.

10. The optical rotary control device of claim 7 wherein said isolator is circular in shape.

11. The optical rotary control device of claim 7 further comprising means for determining which of said light sources is directing light to said light receptor.

12. A radio and an optical rotary control device, comprising:

a radio portion having a rotatable knob for controlling a parameter of said radio;

said optical rotary device comprising;

an opaque radial light isolator having a center aperture with eight radially arranged apertures about said center aperture;

a light receptor disposed within said center aperture of said isolator;

eight light sources disposed within said radially arranged apertures of said isolator;

a light director within said knob of said radio and having a shaft portion and a reflector portion wherein a diameter of said reflector portion is larger than a diameter of said shaft portion and the light director is rotatable about the light receptor, said reflector portion being spaced from said isolator so that said reflector directs light from said light sources to said receptor.

13. The radio and optical rotary control device of claim 12 wherein said light director directs light from at least two of said sources to said receptor simultaneously.

14. The radio and optical rotary control device of claim 12 further comprising an integral logic die connected to said device for outputting a control state to a radio.

15. The radio and optical rotary control device of claim 12 wherein said isolator further comprises means for rotatably connecting said knob to said isolator.

16. The radio and optical rotary control device of claim 12 wherein said light director includes a reflector having a concave surface.

* * * * *